(12) United States Patent
Kahle et al.

(10) Patent No.: US 10,185,874 B2
(45) Date of Patent: Jan. 22, 2019

(54) MICROFORM WORD SEARCH METHOD AND APPARATUS

(71) Applicant: E-Image Data Corporation, Hartford, WI (US)

(72) Inventors: Todd A. Kahle, Hartford, WI (US); Grant Taylor, Harvard, MA (US)

(73) Assignee: E-IMAGE DATA CORPORATION, Hartford, WI (US)

( * ) Notice: Subject to any disclaimer, the term of this patent is extended or adjusted under 35 U.S.C. 154(b) by 0 days.

(21) Appl. No.: 15/842,404

(22) Filed: Dec. 14, 2017

(65) Prior Publication Data

US 2018/0107872 A1    Apr. 19, 2018

Related U.S. Application Data

(63) Continuation of application No. 14/874,971, filed on Oct. 5, 2015, now Pat. No. 9,864,907, which is a continuation of application No. 12/832,487, filed on Jul. 8, 2010, now Pat. No. 9,158,983.

(51) Int. Cl.
*G06K 9/18*    (2006.01)
*G06K 9/00*    (2006.01)
*G06K 9/20*    (2006.01)

(52) U.S. Cl.
CPC ..... *G06K 9/00483* (2013.01); *G06K 9/00442* (2013.01); *G06K 9/2054* (2013.01); *G06K 2209/01* (2013.01)

(58) Field of Classification Search
CPC .......... G06K 9/00442; G06K 9/00483; G06K 9/2054; G06K 2209/01
See application file for complete search history.

(56) References Cited

U.S. PATENT DOCUMENTS

| | | |
|---|---|---|
| 3,563,645 A | 2/1971 | Burke et al. |
| 3,836,251 A | 9/1974 | Hertel et al. |
| 4,205,387 A | 5/1980 | Ovshinsky et al. |
| 4,400,828 A | 8/1983 | Priz et al. |
| 4,499,499 A | 2/1985 | Brickman et al. |
| 4,977,603 A | 12/1990 | Irie et al. |
| 5,061,955 A | 10/1991 | Watanabe |
| 5,137,347 A | 8/1992 | Imai |
| 5,187,776 A | 2/1993 | Yanker |

(Continued)

FOREIGN PATENT DOCUMENTS

EP    1176797 A2    1/2002

OTHER PUBLICATIONS

PCT International Search Report and Written Opinion, PCT/US2012/047173, dated Dec. 7, 2012, 10 pages.

(Continued)

*Primary Examiner* — Amara Abdi
(74) *Attorney, Agent, or Firm* — Quarles & Brady LLP

(57) ABSTRACT

A digital imaging system and method for searching for expressions that appear on a microform medium, the system having a computer including a processor and an input device, and a digital microform imaging apparatus having an area sensor generating a digital microform image of the microform medium. The computer is configured to receive a search expression from the input device, create an expression template representing a shape of the search expression, and search the digital microform image for instances of the expression template.

22 Claims, 11 Drawing Sheets

(56) References Cited

U.S. PATENT DOCUMENTS

| | | | |
|---|---|---|---|
| 5,241,659 | A | 8/1993 | Parulski et al. |
| 5,278,609 | A | 1/1994 | Sakaida |
| 5,394,205 | A | 2/1995 | Ochiai et al. |
| 5,410,611 | A | 4/1995 | Huttenlocher et al. |
| 5,477,343 | A | 12/1995 | Nodelman et al. |
| 5,574,577 | A | 11/1996 | Wally, Jr. et al. |
| 5,585,937 | A | 12/1996 | Kokubo et al. |
| 5,586,196 | A | 12/1996 | Sussman |
| 5,588,067 | A | 12/1996 | Peterson et al. |
| 5,640,466 | A | 6/1997 | Huttenlocher et al. |
| 5,647,654 | A | 7/1997 | Krzywdziak et al. |
| 5,687,253 | A | 11/1997 | Huttenlocher et al. |
| 5,726,773 | A | 3/1998 | Mehlo et al. |
| 5,845,018 | A * | 12/1998 | Breish .............. H04N 1/00795 382/276 |
| 6,038,527 | A | 3/2000 | Renz |
| 6,057,941 | A | 5/2000 | Furukawa et al. |
| 6,301,398 | B1 | 10/2001 | Kimball et al. |
| 6,339,483 | B1 | 1/2002 | Hoshino et al. |
| 6,404,557 | B2 | 6/2002 | Curley et al. |
| 6,476,979 | B1 | 11/2002 | Schaack |
| 6,542,262 | B1 | 4/2003 | Tachibana et al. |
| 6,631,013 | B1 | 10/2003 | Sakaguchi |
| 7,307,765 | B2 | 12/2007 | Fujinawa et al. |
| 8,537,279 | B2 | 9/2013 | Kahle |
| 9,179,019 | B2 | 11/2015 | Kahle |
| 9,197,766 | B2 | 11/2015 | Kahle |
| 2002/0051164 | A1 | 5/2002 | Watanabe et al. |
| 2003/0177115 | A1 | 9/2003 | Stern et al. |
| 2004/0012827 | A1 | 1/2004 | Fujinawa et al. |
| 2004/0111404 | A1* | 6/2004 | Mano .............. G06F 17/2775 |
| 2006/0085477 | A1 | 4/2006 | Phillips et al. |
| 2006/0209365 | A1 | 9/2006 | Lee et al. |
| 2007/0103739 | A1 | 5/2007 | Anderson, Jr. et al. |
| 2008/0012860 | A1* | 1/2008 | Klefenz .............. G06K 9/0061 345/441 |
| 2008/0118162 | A1 | 5/2008 | Siegemund |
| 2008/0235563 | A1* | 9/2008 | Nakamura .......... G06F 3/0483 715/200 |
| 2008/0263023 | A1 | 10/2008 | Vailaya et al. |
| 2008/0284847 | A1 | 11/2008 | Kahle |
| 2008/0288888 | A1* | 11/2008 | Kahle .............. G03B 21/10 715/781 |
| 2009/0227283 | A1 | 9/2009 | Pylvanainen |
| 2010/0098399 | A1 | 4/2010 | Breish et al. |
| 2011/0007334 | A1* | 1/2011 | Fan .................. G06K 9/44 358/1.11 |
| 2011/0304771 | A1 | 12/2011 | Blanchard et al. |
| 2011/0313754 | A1 | 12/2011 | Bastide et al. |
| 2012/0008820 | A1 | 1/2012 | Kahle et al. |
| 2013/0022270 | A1 | 1/2013 | Kahle |

OTHER PUBLICATIONS

"Micro-Image Capture 7M Universal Motorized Digital Microform Viewer/Printer/Scanner, 7-54X Zoom, 1-second capture, W7/W8 & MAC O/S compatible", http://www.microfilmworld.com/micro-imagecapture2000-1,aspx.

"DYI Book Scanner", http://www.diybookscanner.org/forum/viewtopic.php?f=1&t=977.

United States Patent and Trademark Office Before the Patent Trial and Appeal Board, Decision—Institution of Inter Partes Review, *Digital Check Corp. d/b/a ST Imaging v. e-ImageData Corp.*, Case IPR2017-00178, U.S. Pat. No. 9,179,019, Apr. 25, 2017.

United States Patent and Trademark Office Before the Patent Trial and Appeal Board, Decision—Institution of Inter Partes Review, *Digital Check Corp. d/b/a ST Imaging v. e-ImageData Corp.*, Case IPR2017-00177, U.S. Pat. No. 8,537,279, May 8, 2017.

United States Patent and Trademark Office Before the Patent Trial and Appeal Board, Decision—Denying Institution of Inter Partes Review, *Digital Check Corp. d/b/a ST Imaging v. e-ImageData Corp.*, Case IPR2017-00346, U.S. Pat. No. 9,197,766, Jun. 12, 2017.

Reintjes, et al., Final Report, Microfilm Viewer Experiments, May 31, 1971.

Williams, et al., Human-Readable Preservation of Digital Images to Microfilm, Proc. IS&T Archiving Conf., 2004, pp. 183-186.

Datagraphix, ImageMouse Plus (TM) Digital Retrieval System User's Guide, Jul. 26, 2000, 68 pages.

Wicks and Wilson Limited, 5100 Fiche Scanstation Field Service Manual, Part No. 8100022, Issue 2.0, Mar. 12, 2002, 44 pages.

Minolta Co., Ltd., MS2000/MicroSP2000 Service Manual, Copyright 1998, 123 pages.

Minolta Corporation, MS 6000 Digital Microform Scanner (Product Brochure), Copyright 2000, 6 pages.

Minolta, MS 6000 Service Manual, 136 pages (Produced by ST Imaging on Jan. 7, 2016 in connection with *E-Image Data Corp. v. Digital Check Corp.* In the Eastern District of Wisconsin, Case Nos. 2:15-cv-0658 and 2:16-cv-0576.).

Minolta Corporation, MS 7000 Digital Microform Scanner (Product Brochure), Copyright 2001, 6 pages.

Test Report—Minolta UC-1 Universal Film Carrier, Library Technology Reports, Sep.-Oct. 1992, 28 (5):625-634.

Minolta Corporation, UC-5 & UC-5M Universal Roll Carriers (Product Brochure), Copyright 1994, 2 pages.

Parts Manual for UC-6 Motorized Combo Squared Carrier Part No. 201000-01, Copyright 2001 Image Capture Technologies, 25 pages.

Parts Manual for UC-6E, EC, ECM Motorized Combo Squared Carrier Part Nos. 210000-01,02,03, Copyright 2002 Image Capture Technologies, 35 pages.

Minolta UC-6 Universal Carrier Parts Manual, 26 pages (Produced by ST Imaging on Jul. 28, 2016 in connection with *E-Image Data Corp. v. Digital Check Corp.* in the Eastern District of Wisconsin, Case Nos. 2:15-cv-0658 and 2:16-cv-0576.).

Minolta UC-6 Universal Carrier Parts Manual, 10 pages (Produced by ST Imaging on Jul. 28, 2016 in connection with *E-Image Data Corp. v. Digital Check Corp.* in the Eastern District of Wisconsin, Case Nos. 2:15-cv-0658 and 2:16-cv-0576.).

Minolta UC-6 Service Manual, 15 pages (Produced by ST Imaging on Jul. 28, 2016 in connection with *E-Image Data Corp. v. Digital Check Corp.* in the Eastern District of Wisconsin, Case Nos. 2:15-cv-0658 and 2:16-cv-0576.).

Minolta Universal Carrier UC-7 Technical Manual, 32 pages (Produced by ST Imaging on Jul. 28, 2016 in connection with *E-Image Data Corp. v. Digital Check Corp.* in the Eastern District of Wisconsin, Case Nos. 2:15-cv-0658 and 2:16-cv-0576.).

UC 6 Installation Instructions For: Minolta MicroSP2000 / MS2000 Scanner; Minolta RP603Z; Minolta RP605Z / RP606Z; Minolta MS3000; Minolta RP607Z, 25 pages (Produced by ST Imaging on Jul. 28, 2016 in connection with *E Image Data Corp. v. Digital Check Corp.* in the Eastern District of Wisconsin, Case Nos. 2:15-cv-0658 and 2:16-cv-0576.).

New Products, Computer, May 1976, pp. 89-95.

New Products, Computer, Jan. 1977, pp. 67-73.

Microfilm ScanPro 1000 (Product Information), https://web.archive.org/web/20061104152004/http://e-imagedata.com/ScanPro_1000.htm, 2 pages (Produced by ST Imaging on Mar. 9, 2016 in connection with *E-Image Data Corp. v. Digital Check Corp.* in the Eastern District of Wisconsin, Case Nos. 2:15-cv-0658 and 2:16-cv-0576.).

S-T Imaging, Products, https://web.archive.org/web/20010410045943/http:/www.stimaging.com/11_products.html., Copyright 2000, 1 page.

Claim Construction Order, *E-Image Data Corp. v. Digital Check Corp.*, United States District Court, Eastern District of Wisconsin, Case No. 2:16-cv-0576, Nov. 4, 2016.

* cited by examiner

200a ⎯ The House voted for it 117–84, with 16 Republican votes. In the Senate, the tally was 37-13. Rendell said he would sign the general appropriations bill when lawmakers also send him the fiscal code, which specifies how the money is to be spent, and the measure to authorize borrowing for capital projects.

200b ⎯ House Majority Leader Todd Bachus, D-Lucerne, said the education funding would forestall an increase in school property taxes, and the economic development funding would address the state's economic climate.

200c ⎯ "It's a good day when Republicans and

200d ⎯ comprise product and painful financial times.

"It's important for us to reflect the recession we're in ... by having a budget that constrains spending," said Appropriations Chairman Jake Corman, R-Centre.

The budget deal boosted spending over 2009-10 by less than 1 percent. House Democratic leaders got some help from Republicans in mustering the supermajority required to waive a rule that requires 24 hours' notice before a bill is voted.

On the House floor, Republicans

Fig. 8

MICROFORM WORD SEARCH METHOD AND APPARATUS

CROSS-REFERENCE TO RELATED APPLICATIONS

This application claims the benefit of and is a continuation application of U.S. patent application Ser. No. 14/874,971 filed on Oct. 5, 2015, which claims the benefit of and is a continuation application of U.S. patent application Ser. No. 12/832,487 filed on Jul. 8, 2010, now U.S. Pat. No. 9,158,983 the entire disclosures of which are considered part of the accompanying application and are hereby incorporated by reference as if fully set forth herein.

STATEMENT REGARDING FEDERALLY SPONSORED RESEARCH/DEVELOPMENT

Not applicable.

BACKGROUND OF THE INVENTION

Field of the Invention

The present invention relates to a computer user interface for a digital microform imaging apparatus and more specifically to a method and apparatus that facilitates word searching on real time microform images and that highlights instances of search words on a display when located.

Description of the Related Art

Microform images are useful in archiving a variety of documents or records by photographically reducing and recording the document in a film format. Examples of typical microform image formats include microfilm/microfiche, aperture cards, jackets, 16 mm or 35 mm film roll film, cartridge film and other micro opaques. For example, a microfiche article is a known form of graphic data presentation wherein a number of pages or images are photographically reproduced on a single "card" of microfiche film (such as a card of 3×5 inches to 4×6 inches, for example). A large number of pages (up to a thousand or so) may be photographically formed in an orthogonal array on a single microfiche card of photographic film. The microfiche film may then be placed in an optical reader and moved over an optical projection path of a film reader until a selected page is in the optical projection path. The reader generates an image of the selected page which is then presented on an imager screen for viewing. Although other electronic, magnetic or optical imaging and storage techniques and media are available, there exists an extensive legacy of film type records storing the likes of newspapers and other print media, business records, government records, genealogical records, and the like.

Early microform readers included a projection type system that projected light through the film and on to a screen as well as optics to adjust the magnification of the images generated on the screen. To obtain a copy of an image, at least some of these systems were equipped with printers that would print hard copies of any images required. More recently, digital microform imaging apparatus (DMIA) have been developed that include an imaging sensor as well as optics for focusing film images onto the sensor. The sensor generates a digital bitmap image of the segment of the film in the optical projection path of the reader and provides the bitmap image to a desktop computer. The computer uses the bitmap image to drive a display thereby generating a digital image of the film segment for viewing by a user. The computer can be used to manipulate the bitmap image in many different ways including zooming in and out on the image, rotating the image, changing image contrast, annotating the image, etc. In addition, because the image is in a digital format, the image can be stored for subsequent access in a non-volatile memory.

The typical way microform systems are used is that a person that needs to locate information that may be stored on a microform medium identifies one or more microform storage medium (e.g., a microfilm roll) that may include the information being sought and loads the storage medium onto a microform imaging machine. The user then attempts to determine which section of the storage medium may include the information sought and aligns that segment of the storage medium with the optical projection path to generate an image on a display. The user reads/examines the imaged segment or at least a portion thereof in an attempt to find the information sought. More often than not the information sought is not located in the imaged segment and therefore the user moves on to a different segment of the storage medium or to another storage medium without storing or printing out an image of the segment. Once sought information is located in a segment, the user may either print out or store or both print and store the segment image for subsequent access. Thus, in most cases, while a microform imager user may examine a large number of microform segments, the user will only store or print a relatively small number of the segments for subsequent access.

In any medium in which most information is expressed in printed words, searching tasks are greatly expedited if word searching can be automated. For instance, in the case of a 1000 page Microsoft Word document where one segment of the document discusses Alexander Hamilton's relationship with George Washington during the Revolutionary War, for a person unfamiliar with the layout of the document and in need of locating the segment discussing Hamilton, automated word search capability where a computer processor can locate each instance of the name "Alexander Hamilton" in the document is invaluable. In the case of a Word document or the like, the stored document takes the form of a set of ASCII (American Standard Code for Information Interchange) characters, one for each character (i.e., letter, number, space, etc.) in the document. To search for a word, a processor simply compares an ASCII character set representing the word with characters in the document and identifies instances of matches. Thereafter, the processor may highlight the space around each character in a matched word for a user to see via a computer output display screen.

In the case of a bitmap image like a PDF (Portable Document Format), one way to search for words in the document is to perform an Optical Character Recognition (OCR) process on the document prior to the word search process to convert the PDF bitmap image into an ASCII type document (hereinafter "an OCR processed document"). After an OCR processed document has been generated and stored, a word search is performed in the usual manner by comparing an ASCII character set that represents a word to be searched with ASCII characters in the document to locate instances of the word.

One other way to search for words in a PDF or other bitmap type document is described in U.S. Pat. No. 5,687,253 (Hereinafter the '253 patent"). The '253 patent describes a word search process that is based on word shapes as opposed to the results of a prior OCR process. To this end, the '253 patent describes that a bitmap document image can be processed to generate a word shape for each word in the document and then the word shapes of known words from a dictionary can be compared to the word shapes of the words in the document.

While several advantages are associated with word searching capabilities in images that include text, there is no known microform imaging system that facilitates word searching capabilities of any images, much less real time images generated by an imaging system.

BRIEF SUMMARY OF THE INVENTION

The present disclosure includes a microform imaging system that includes a processor that uses a digital bitmap image from a microform system to drive a display with a real time image and that enables a user to enter a search expression/word, instances of which are to be located and visually distinguished in the real time image. The visually distinguished words help the user to ascertain whether or not a particular image is of interest to the user and, when an image is of interest, the user can either store the image in long term non-volatile memory or can print out a copy of the image. Thus, in at least some cases real time images are searched for words/expressions and there is no need to store the images in non-volatile memory prior to searching.

In at least some embodiments the processor performs the word search function without the need to convert text in the image via OCR processes to character strings. This is accomplished in some embodiments by creating a search template for a search expression and using the template to search for word instances. Searching via a word search template as opposed to via an OCR processed document has been found to be faster and in some cases more accurate. Some embodiments of the disclosure include an apparatus for searching for expressions that appear on a microform medium, the apparatus comprising a microform imager including a sensor for generating digital microform images of one segment of the microform medium at a time, a display screen and a processor programmed to, while the microform imager is generating a digital microform image (i) use the digital microform image generated by the microform imager to drive the display screen, (ii) search the digital microform image presented via the display screen for instances of a search expression and (iii) visually distinguish the located search expressions in the digital microform image presented via the display screen.

In some cases the segment of the microform imaged by the sensor can be changed and wherein, when the segment of the microform imaged is changed from a first segment to a second segment so that a first digital microform image corresponding to the first segment is replaced by a second digital microform image corresponding to the second segment, the processor eliminating the first digital microform image from memory so that the first digital microform image is not persistently stored for subsequent access. In some embodiments the apparatus further includes a persistent non-volatile memory and an input device whereby a user can indicate via the input device that a displayed digital microform image should be stored in the persistent memory and wherein, prior to an indication that the digital microform image should be stored in the persistent memory, the digital microform image is stored in a non-persistent memory.

In some cases the processor stores the digital microform image in random access memory (RAM) as a RAM image and searches the RAM image for instances of the search expression. In some embodiments the apparatus further includes a non-volatile memory in which at least a subset of digital microform images are to be persistently stored, the processor searching for instances of the search expression in digital microform images prior to storing the images in the non-volatile memory. In some cases the processor visually distinguishes by highlighting instances of the search expression in the digital microform image presented on the display screen. In some embodiments the apparatus further includes an input device useable to specify the search expression, the processor searching by searching for the search expression entered via the input device. In some cases the input device includes a search input field presented via the display screen in which an apparatus user enters the search expression. In some cases the microfilm medium segment used to generate the digital microfilm image can be changed by a user and wherein, when the microfilm medium segment used to generate the digital image is changed, the digital microform image presented via the display is changed and the search input field is persistently presented via the display screen so that the user can cause the processor to search for the search expression in the changed digital microform image.

In some cases the search expression includes a word. In some cases the processor searches for search expression instances without performing OCR on the digital microform image. In some cases the processor searches for instances of the search expression by first creating an expression template representing the shape of the search expression and then searching the digital microform image for instances of the expression template. In some cases the processor searches for instances of the expression template by selecting a portion of the expression template as an initial template, searching the digital microform image for instances of the initial template to identify expression candidates and then searching areas around each expression candidate within the digital microform image for an instance of the search expression using the expression template.

Other embodiments include an apparatus for searching for expressions that appear on a microform medium, the apparatus comprising a microform imager including a sensor for generating a digital microform image of one segment of the microform medium at a time wherein the imager includes controls for changing the segment of the microform medium that is used to generate the digital image, a display screen for displaying the digital microform image, a non-volatile memory and a processor programmed to receive the digital microform image generated by the imager and, prior to persistently storing the digital microform image in the non-volatile memory (i) search for instances of a search expression in the digital microform image and (ii) when at least one instance of the search expression is located within the digital microform image, visually distinguish the at least one instance of the search expression on the display screen.

Some embodiments include a method for searching for expressions that appear on a microform medium, the method comprising the steps of using a microform imager including a sensor to generate digital microform images of one segment of the microform medium at a time, while the microform imager is generating a digital microform image (i) using the digital microform image generated by the microform imager to drive a display screen, (ii) searching the digital microform image presented via the display screen for instances of a search expression and (iii) visually distinguishing the located search expressions in the digital microform image presented via the display screen.

In some cases the segment of the microform imaged by the sensor can be changed and wherein, when the segment of the microform imaged is changed from a first segment to a second segment so that a first digital microform image corresponding to the first segment is replaced by a second digital microform image corresponding to the second segment, eliminating the first digital microform image from memory so that the first digital microform image is not persistently stored for subsequent access.

In some cases the method is for use with a persistent non-volatile memory and an input device, the method further including the steps of receiving an indication via the input device that a displayed digital microform image should be stored in the persistent memory and wherein, prior to the indication that the digital microform image should be stored in the persistent memory, storing the digital microform image in a non-persistent memory. In some cases the method further includes the step of storing the digital microform image in random access memory (RAM) as a RAM image and searching the RAM image for instances of the search expression. In some cases the method is for use with a non-volatile memory in which at least a subset of digital microform images are to be persistently stored, the method further including the step of searching for instances of the search expression in digital microform images prior to storing the images in the non-volatile memory. In some cases the step of visually distinguishing includes highlighting instances of the search expression in the digital microform image presented on the display screen.

In some cases the method is for use with an input device useable to specify the search expression, the method including searching for search expression entered via the input device. In some cases the input device includes a search input field presented via the display screen in which an apparatus user enters the search expression. In some cases the microfilm medium segment used to generate the digital microfilm image can be changed by a user and wherein, when the microfilm medium segment used to generate the digital image is changed, the digital microform image presented via the display is changed and the search input field is persistently presented via the display screen so that the user can cause searching for the search expression in the changed digital microform image. In some cases the search expression includes a word.

In some cases the step of searching for search expression instances includes searching without performing OCR on the digital microform image. In some cases the step of searching for instances of the search expression includes first creating an expression template representing the shape of the search expression and then searching the digital microform image for instances of the expression template. In some cases the step of searching for instances of the expression template includes selecting a portion of the expression template as an initial template, searching the digital microform image for instances of the initial template to identify expression candidates and then searching areas around each expression candidate within the digital microform image for an instance of the search expression using the expression template.

Yet other embodiments include a method for searching for expressions that appear on a microform medium, the method comprising the steps of using a sensor to generate a digital microform image of one segment of the microform medium at a time wherein the imager includes controls for changing the segment of the microform medium that is used to generate the digital image and using a processor to receive the digital microform image generated by the imager and, prior to persistently storing the digital microform image in a non-volatile memory (i) searching for instances of a search expression in the digital microform image and (ii) when at least one instance of the search expression is located within the digital microform image, visually distinguish the at least one instance of the search expression on the display screen.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 8 is a schematic illustrating a line search pattern over microform image text that is consistent with at least some embodiments of the present invention;

DETAILED DESCRIPTION OF THE INVENTION

Figure 1:
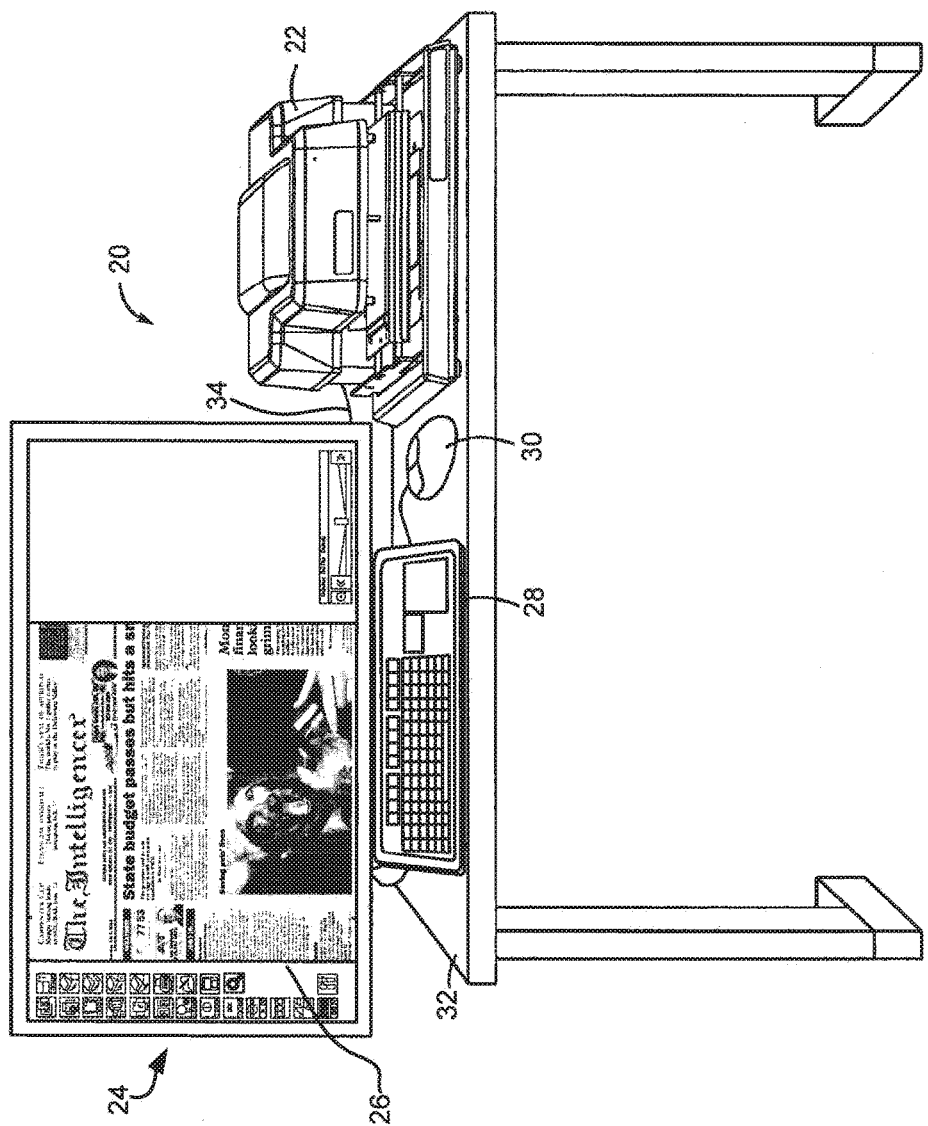
FIG. 1 is a perspective view a DMIA and associated computer that are consistent with at least some aspects of the present invention.
Figure 2:
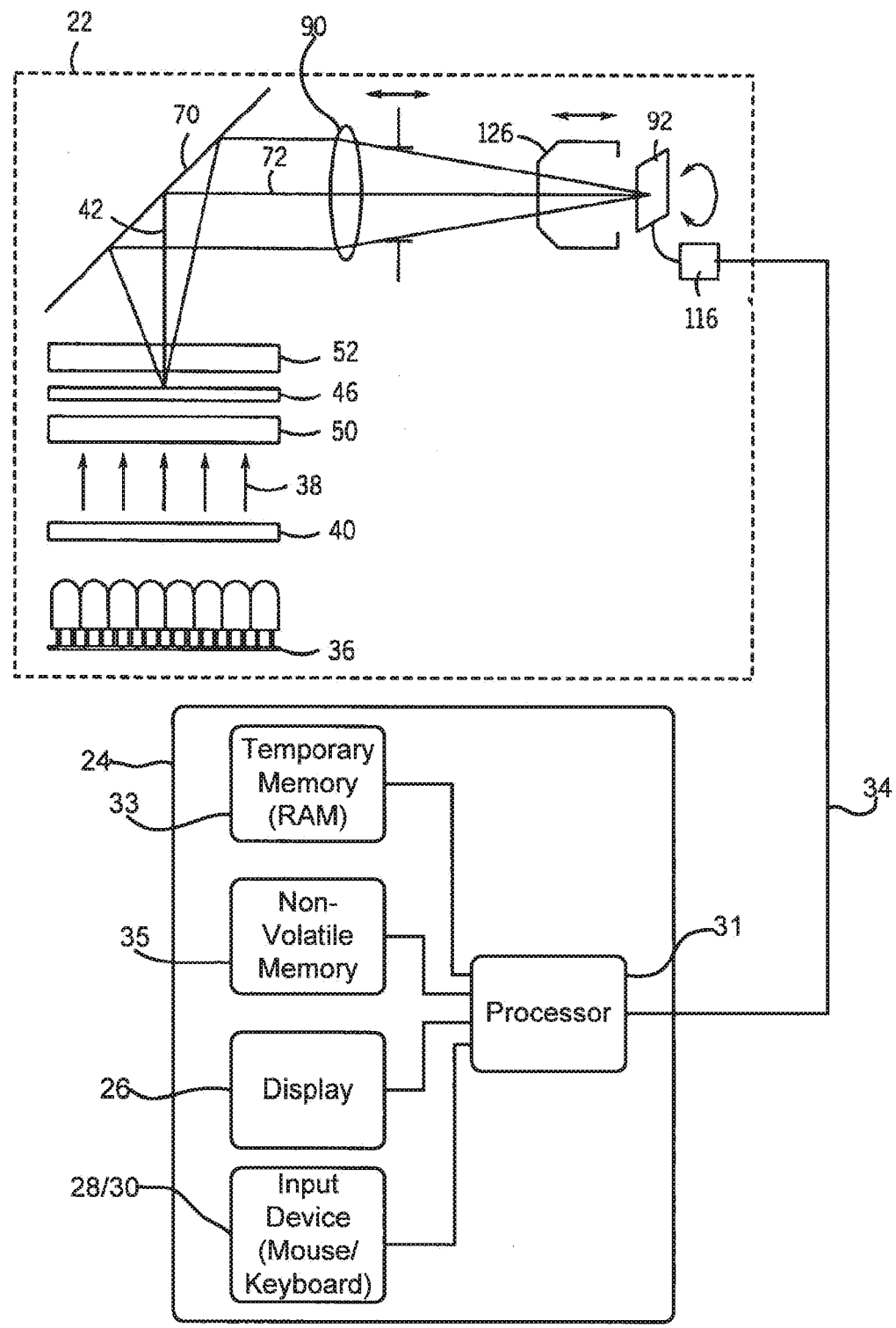
FIG. 2 is a schematic illustrating various components of the DMIA and computer shown in FIG. 1 in greater detail.

Referring now to the drawings wherein like reference numerals correspond to similar elements throughout the several views and, more specifically to FIG. 1, there is shown a digital microform imaging system 20 which generally includes a digital microform imaging apparatus (DMIA) 22 connected to a computer 24. Referring also to FIG. 2, computer 24 includes one or more displays 26, one or more user input devices such as a keyboard 28 and/or a mouse 30, a processor 31, a temporary memory 33 (i.e., a random access memory (RAM)) and a non-volatile memory 35. DMIA 22 and computer 24 can be placed on a worksurface 32 of a desk or the like for convenient access and ease of use. DMIA 22 is connected for communication (e.g. via Firewire IEEE 1394) to computer 24 via cable 34. Although cable 34 is described as an electrical type cable, alternatively DMIA 22 and computer 24 can communicate via fiber optics, wirelessly through infrared or radio frequencies, etc. Other details of computer 24 and the general computing environment are discussed in more detail below.

Figure 3:
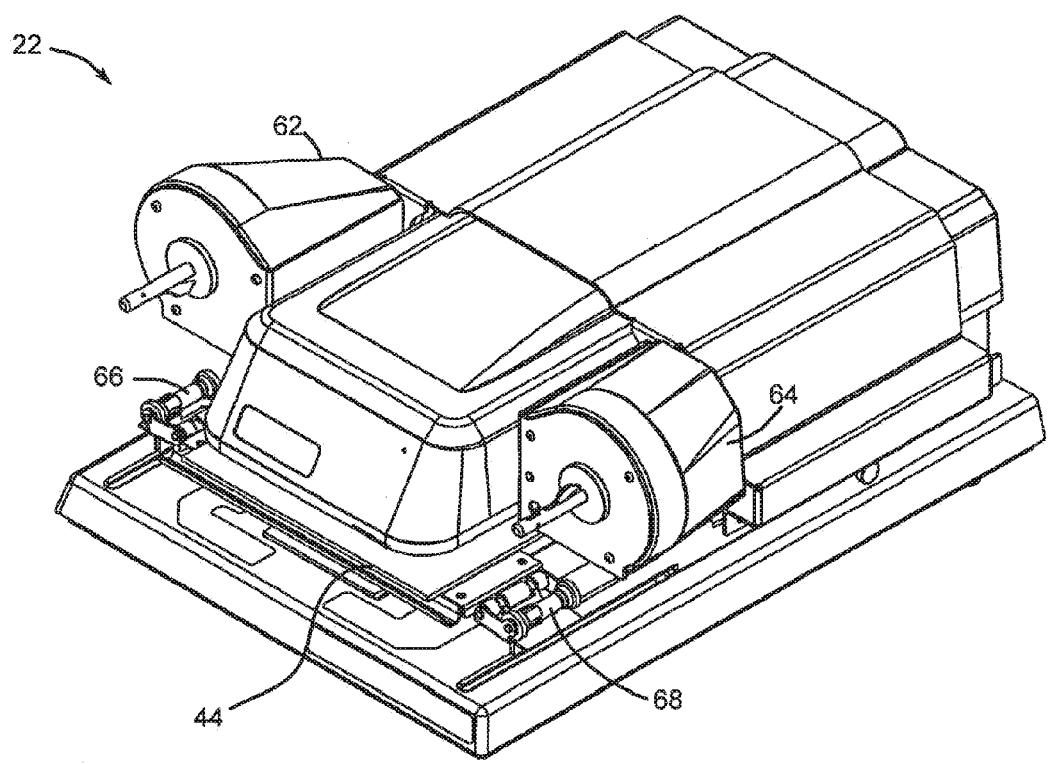
FIG. 3 is a perspective view of the DMIA shown in FIG. 1.

DMIA 22 is described in U.S. patent application Ser. No. 11/748,692, titled "DIGITAL MICROFORM IMAGING APPARATUS", filed May 15, 2007, which application is incorporated by reference. Referring more particularly to FIGS. 2 and 3, DMIA 22 includes an approximately monochromatic illumination source 36, such as a light emitting diode (LED) array which transmits incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source.

A microform media support 44 is configured to support a microform media 46 within the path of light 38 and along first optical axis 42. In the embodiment shown support 44 is an X-Y table which is movable in a plane which is approximately orthogonal to first optical axis 42. Microform media support 44 includes a frame which supports a first window 50 on one side of media 46 and a second window 52 on the other side of media 46. Although not shown, second window 52 hinges upward when the frame is moved forward and similarly hinges downward when the frame is moved rearward. In this way the microform media 46 can be placed and held securely between windows 50, 52 for viewing.

An approximately 45° fold mirror 70 (FIG. 2) reflects the incident light transmitted through microform media 46 approximately 90° along a second optical axis 72. First optical axis 42 and second optical axis 72 can be thought of as segments of the single or main optical axis. Fold mirror 70 advantageously shortens the overall longitudinal length of the optical axis which allows DMIA 22 to be more compact.

An imaging subsystem includes a lens 90 that includes an adjustable aperture. Lens 90 may have a fixed focal length of 50 mm, for example, which has the advantage of a relatively large depth of focus. An area sensor 92 includes an area array CCD sensor with a two dimensional array of sensor elements or pixels, for example, with a 3.5 µm2 pixel size, or other types of sensors and pixel sizes depending on resolution size requirements. The area array nature of sensor 92, when compared to a line sensor, eliminates the need for scanning of the sensor when viewing two dimensional images. A light baffle 126 can be connected to area sensor 92 to reduce stray light incident on sensor 97 and thereby further improve the resolution and signal to noise of DMIA 22. Light baffle 126 can have an antireflective coating at the front and inside surfaces of the baffle to further reduce stray light incident on sensor 92. Algorithms for moving the lens and sensor to appropriate respective locations to achieve proper magnification and focus of an image allows DMIA 22 to autofocus without the need for iterative measurements and refocusing of the lens 90 during magnification changes to accommodate different reduction ratios of different film media.

A controller 116 is electrically connected to motors associated with lens 90 and area sensor 92 where the controller 116 is for receiving commands and other inputs from computer 24 or other input devices, controlling the motors and other elements of DMIA 22, and for outputting a digital microform image corresponding to area sensor 92. To this end, controller 116 includes one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36. The motors can be DC servomotors, or other motors.

The present invention is not limited by the DMIA 22 shown as there are other DMIAs, or microfilm or micro opaque readers, scanners, etc., which are available which can be used in conjunction with a computer and the CUI of the present invention. Further, the present invention is not limited by a separate DMIA 22 and computer 24. For example, computer 24 can be integrated into DMIA 22, or can be part of controller 116. Yet further, monitor 26 can be a part of DMIA 22 instead of a separate device.

Media 46 can include any microform image formats such as microfilm/microfiche, aperture cards, jackets, 16 mm or 35 mm film roll film, cartridge film and other micro opaques. Micro opaques are different than transparent film. Images are recorded on an opaque medium. To view these micro images one needs to use reflected light. The present invention can use LED arrays (not shown) for use with micro opaques, which can be the same, or similar to, the monochromatic LED's that are used in illumination source 36. In the embodiment of FIG. 3, DMIA 22 includes a microform media support in the form of motorized roll film attachment with supply side 62 and take up side 64 and film guides 66 and 68, in addition to an X-Y table 44.

Figure 4:
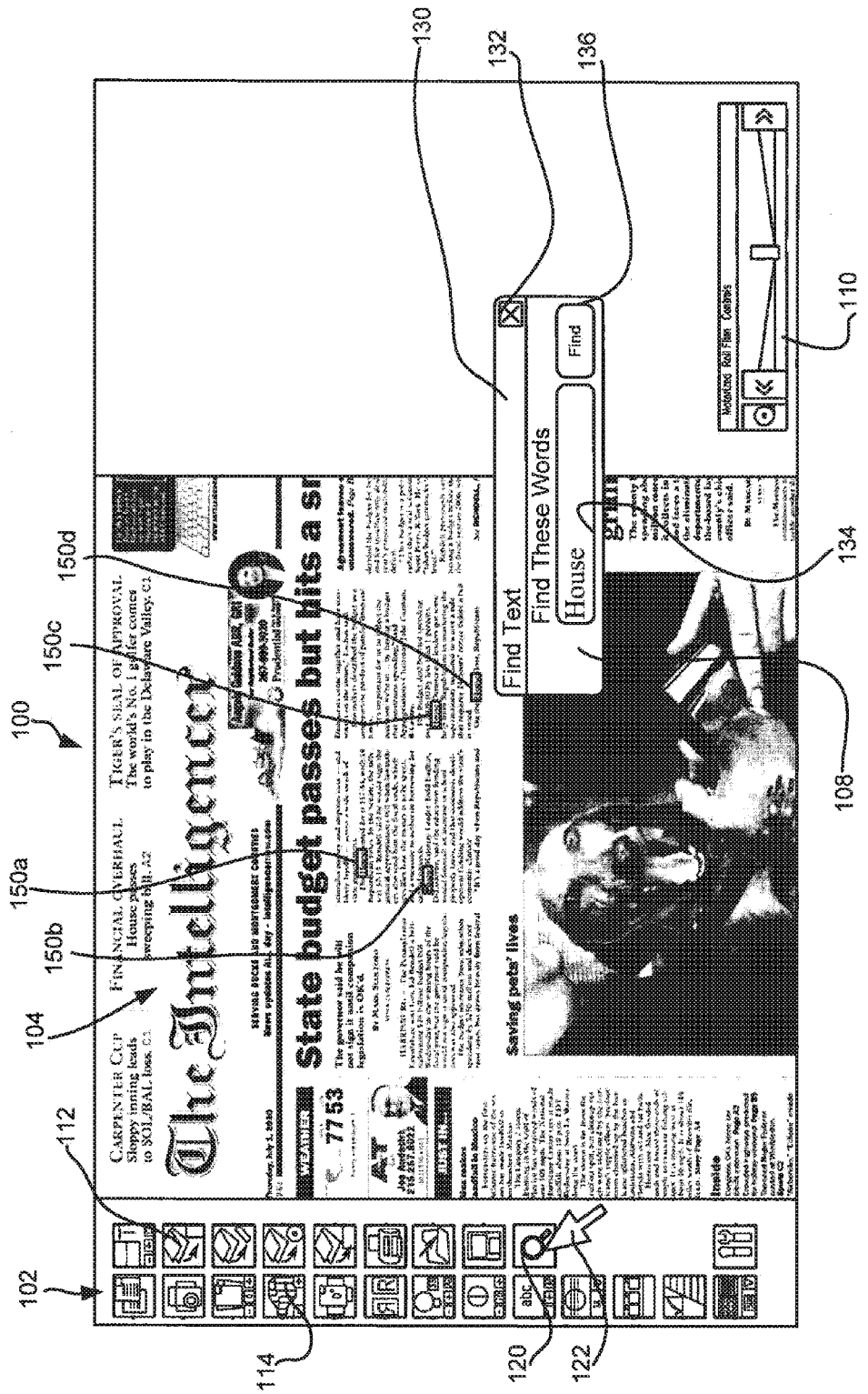
FIG. 4 is a schematic illustrating a screenshot of the user interface shown in FIG. 1.

Referring now to FIGS. 1 and 4, computer 24 includes a software computer user interface (CUI) 100 displayed by monitor 26 with user inputs to control DMIA 22 in general. CUI 100 can be in the form of at least one instruction executed by processor 31, where the instructions of 100 are stored on a computer-readable storage medium. CUI 100 generally includes a display area 104 and a toolbar 102 with user selectable controls. The user selectable controls presented via toolbar 159 include, among others, an image zoom control repeated by icon 114, a save control represented by icon 112 and a word search control represented by search icon 120. The toolbar controls 159 can be selected by a user moving a mouse controlled cursor 122 (see FIG. 4) on to one of the icons and a left clicking mouse 30. A film control tool 110 is also presented via CUI 100 that can be used by a system user to advance or back up a roll of film supported by DMIA 22.

Referring still to FIG. 4, and also again to FIGS. 1 through 3, when a DMIA user places a microform segment within the path of light 38, sensor 92 generates a digital microform image which is provided via cable 34 to processor 31. Processor 31 uses the digital microform image to directly drive display 26. Thus, as the microform image is altered, the image presented via display 26 is immediately altered as well so that the image obtained by sensor 92 is always used to drive display 26 essentially in real time. Here, the bitmap image that is displayed is not stored in non-volatile memory 35 until the system user selects save icon 112. By not storing the real time images, the process of scanning the microform segments and presenting the segments via display 26 is expedited and the overall process is more appealing to the end user as scanning and image presentation appears to be and actually is more fluid.

In FIG. 4, an exemplary image of a front page of a newspaper is shown in display area 104. The image includes pictures and text which comprise various articles. The icons in toolbar area 102 can be selected to modify the appearance of the microform image area 104. For example, a segment or portion of the image in area 104 is shown in an enlarged or zoomed format in FIG. 5. Here, the image in area 104 is a digital bit map image and, in at least some embodiments, the image is never processed via an optical character recognition (OCR) process.

Figure 5:
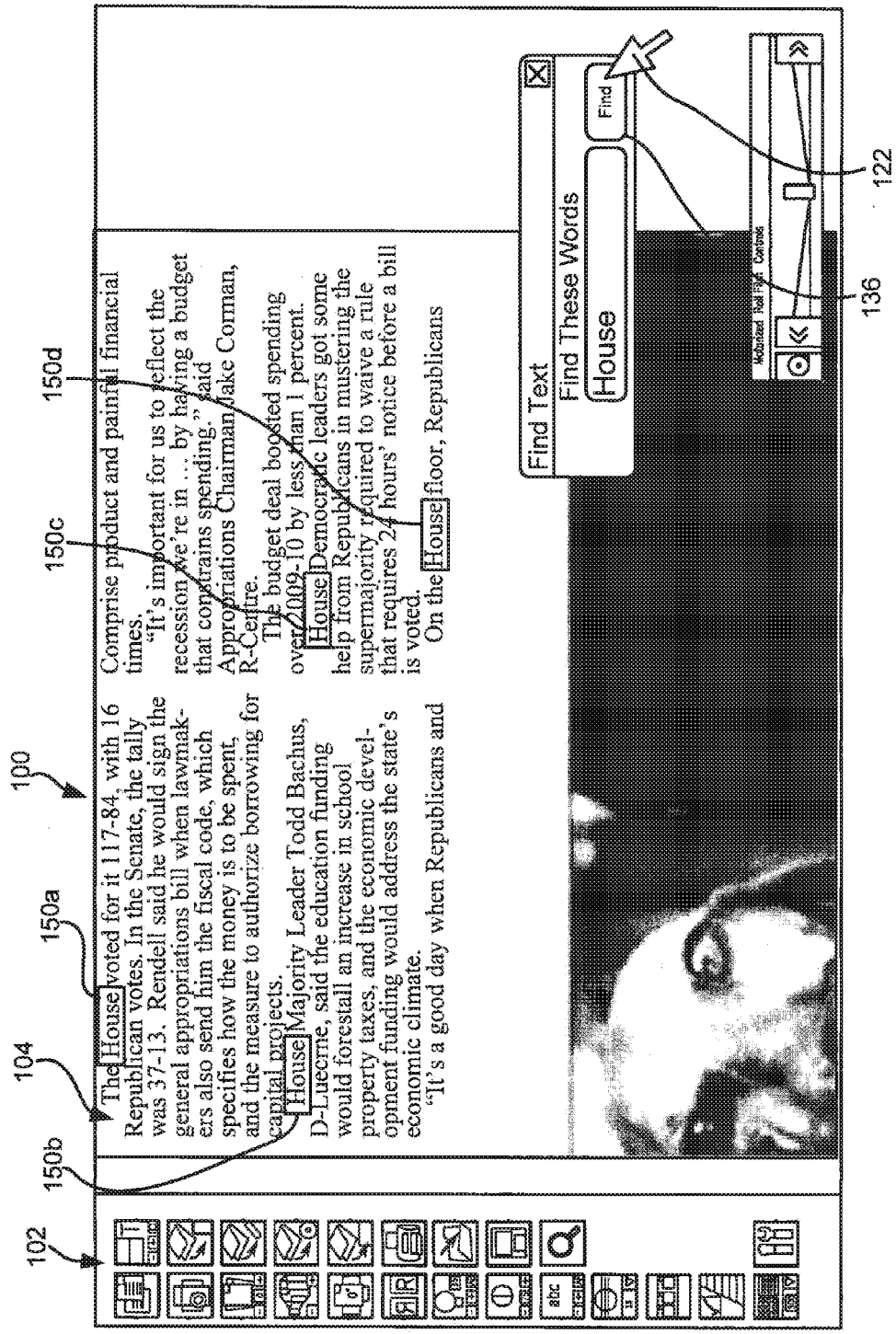
FIG. 5 is a similar to FIG. 4, albeit showing a screenshot where a displayed microform image shown in FIG. 4 has been enlarged.

Referring still to FIGS. 4 and 5, one particularly advantageous function that is associated with the present disclosure allows a system user to cause processor 31 (see also FIG. 2) to search an image presented within area 104 for specific words or phrases that may be of interest to the system user. For example, where a system user is looking for articles related to a House of Representatives within a state, the user may want to search for any instances of the term "House" in stories within a newspaper that is stored on a microform storage medium. With an image to be searched presented in area 104, referring to FIG. 4, a system user can select search icon 120 via cursor 122. When icon 120 is selected, in at least some embodiments of the present disclosure, a separate "find text" window 108 is opened. Window 108 includes a title bar 130, a "window close" icon 132, a search expression field 134, and a "find" icon 136. Title bar 130 can be used to move window 108 to different locations within CUI 100. Window close icon 132 can be selected to close the find text window 108. Expression field 134 is provided to allow the user to enter text or a phrase to be searched for within the presented image. Here, text is entered by selecting field 134 and then using keyboard 28 (see again FIG. 1). Once a search expression is entered within field 134, the user can select find icon 136 to submit the search expression to processor 31 for searching purposes.

Referring still to FIG. 4 and now also to FIG. 5 where a portion of the image in FIG. 4 has been enlarged, it can be seen that in the present example, after the term "house" has been entered in field 134 and find icon 136 has been selected, the processor 31 locates four separate instances of the search expression "house," where the separate instances are labeled 150a, 150b, 150c and 150d. In the illustrated embodiment, each instance of the search expression identified within a presented image is visually distinguished in some fashion. For instance in FIGS. 4 and 5, each instance 150a through 150d is visually distinguished by placing a rectangle around the instance. Other ways of visually distinguishing include highlighting each instance, placing a blinking box around each instance, placing an arrow adjacent each instance, etc.

Figure 6:
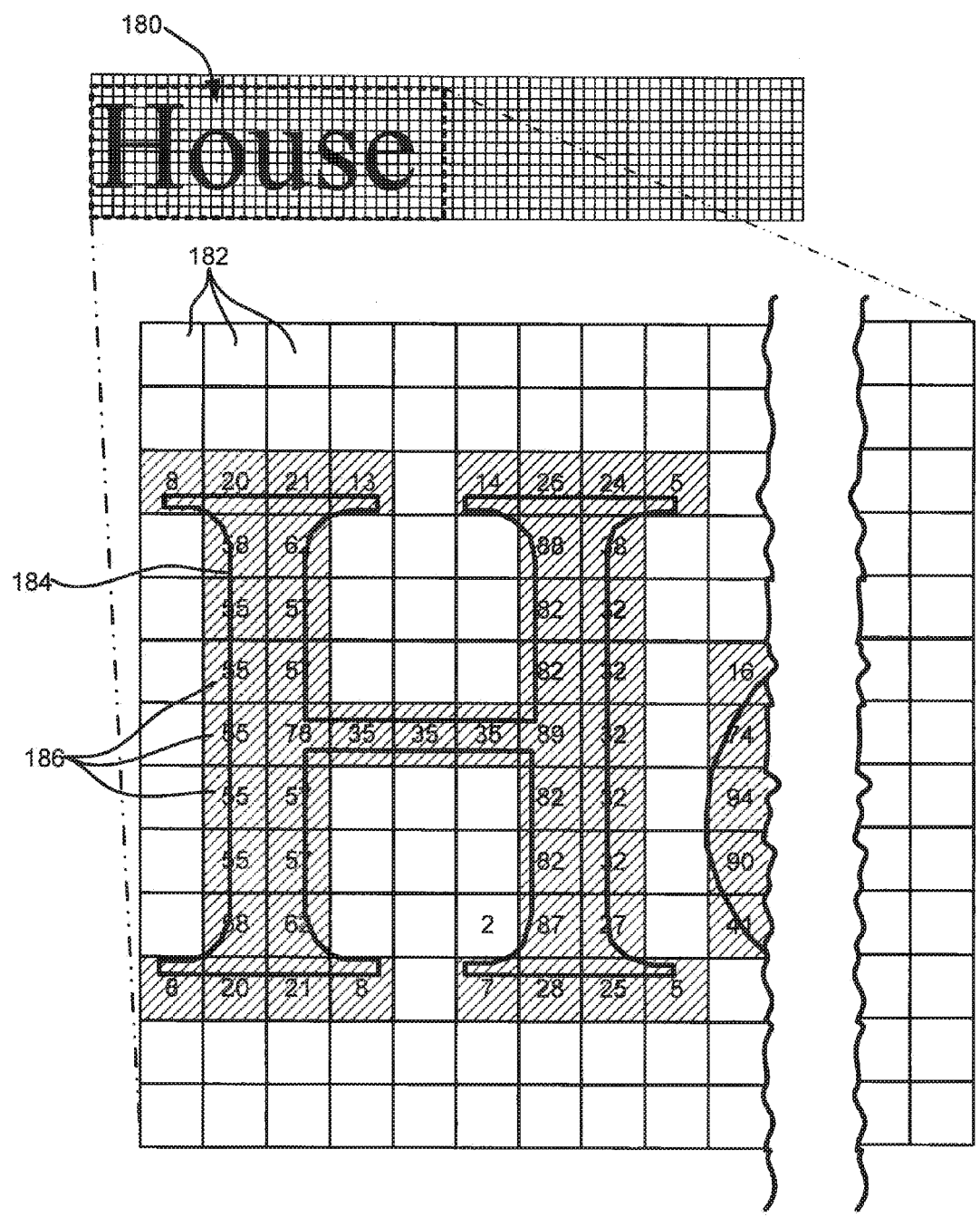
FIG. 6 is a schematic illustrating a search template that is consistent with at least some aspects of the present invention.

Importantly, the expression or work search method in at least some embodiments of the present invention is preformed without the need for OCR processing and instead is performed directly on the bit map image presented within area 104. To this end, in at least some embodiments, after a search expression has been received by processor 31, the processor creates a template of the search word or expression and then performs an iterative search of the displayed image to find instances of the expression. More specifically, in at least some embodiments, referring to FIG. 6, to create a search expression template, after a search expression has been received, processor 31 lays a multi-column and row raster over the search expression and then, for each element in the raster, generates an element value that indicates a percentage of the element covered by the search expression. In FIG. 6, raster elements are generally identified by numeral 182 where an "H" from the search expression "house" is shown covering a portion of the raster where raster elements that are overlapped by the search expression are shown in cross-hatch. Exemplary elements overlapped by the letter H are collectively identified by numeral 186. The combination of numbers representing the percentages of elements overlapped by the search expression comprise the template 180 in the present example. Other template types are contemplated where weights may be applied to element values based on empirical data related to modifications that tend to increase accuracy of search results. In addition, more complex templates are contemplated, the illustrated template having been simplified in the interest of simplifying this explanation.

Figure 7:
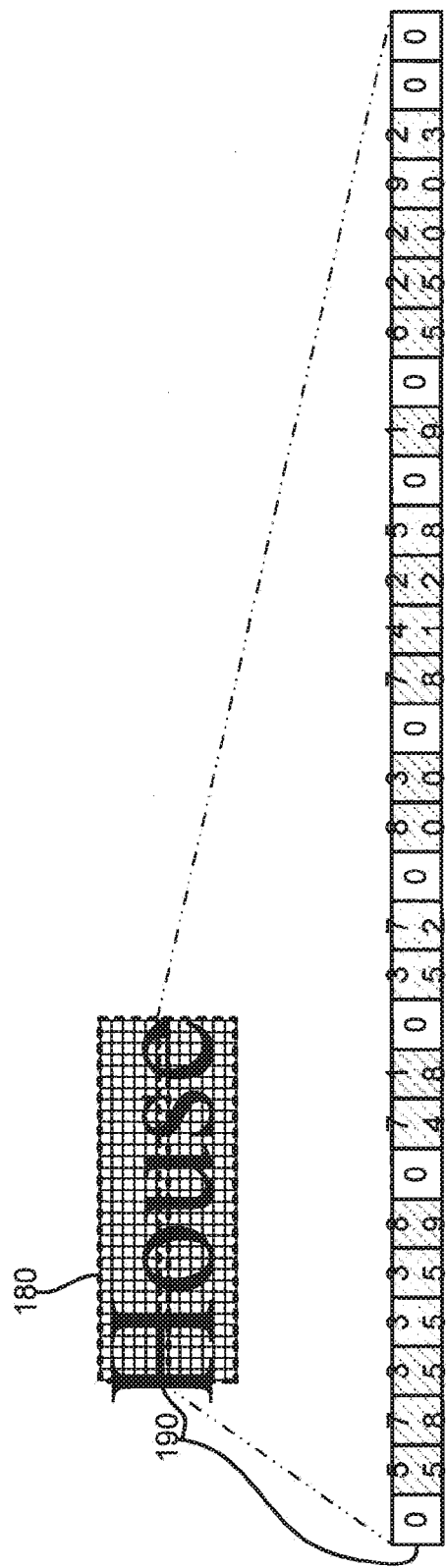
FIG. 7 is a schematic illustrating a portion of the template shown in FIG. 6 that is used during a first phase of a search process in at least some embodiments of the present invention.

After the search expression template has been generated, in at least some embodiments, processor 31 selects a portion of the template to be used during a first rough phase of the image searching process designed to quickly identify word/expression match candidates. Referring to FIG. 7, in at least some embodiments, the template portion used for the first phase of the search includes a generally central line pattern 190 through the template elements where each element in the selected portion includes a number indicating the percentage of the element overlapped by the search expression. Hereinafter, the portion 190 is described as a center pattern. While a center pattern is used in the present example during the first phase of searching, it should be appreciated that other patterns derived from the template may be employed and the invention should not be limited to use of a center pattern during the first rough search phase.

After the center pattern 190 has been identified, referring to FIG. 8, the processor 31 searches along a series of horizontal lines through the image presented in area 104 (see again FIG. 5) for possible matches between the center pattern and data within the digital bit map microform image. Exemplary search lines are collectively labeled 200 in FIG. 8. While only a small number of search lines are shown in FIG. 8, it should be appreciated that a large number of search lines are used during normal operation so that any and all instances of the center pattern are detected and associated with at least one of the search lines. An exact match between the center pattern and a portion of a search line is not required to identify a possible instance of the search expression and instead, some error is tolerated as a second search phase is used to eliminate erroneous instances of identified search expressions. In FIG. 8, exemplary lines 200a, 200b, 200c, and 200d correspond to separate possible instances of the search expression house.

Figure 9:
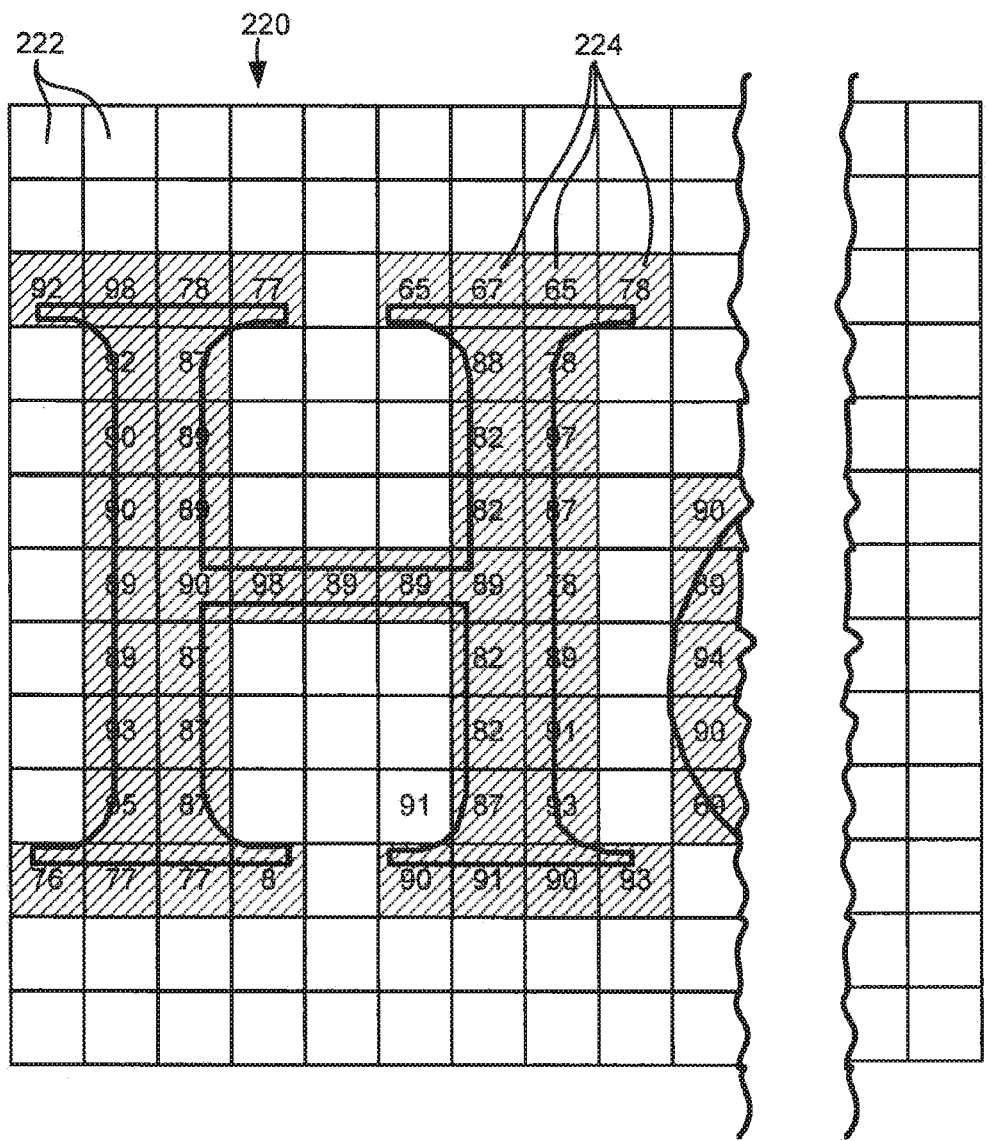
FIG. 9 is a schematic illustrating exemplary match scores for a possible template to search expression match that is consistent with at least some embodiments of the present invention.

Once possible instances of the search expression have been located, processor 91 uses the entire search template 180 to search the area around each possible instance to more accurately identify and verify instances of the search expression that have been identified. To this end, referring to FIG. 9, for each element 222 in the search template, in at least some embodiments, match scores are provided that indicate how closely a possible search expression instance matches the template. In FIG. 9, match scores are provided for each template element (see cross-hatched elements) that is at least partially overlapped by the search expression (see "H" and portion of "O" in FIG. 9) where a relatively higher match score indicates a better correlation between a template element and a match candidate element. Where the combination of matched scores corresponds to a value that is greater that a match threshold, a template to expression match is determined to have occurred and processor 31 then highlights or otherwise visually distinguishes the instance within area 104 (see again FIG. 5).

Figure 10:
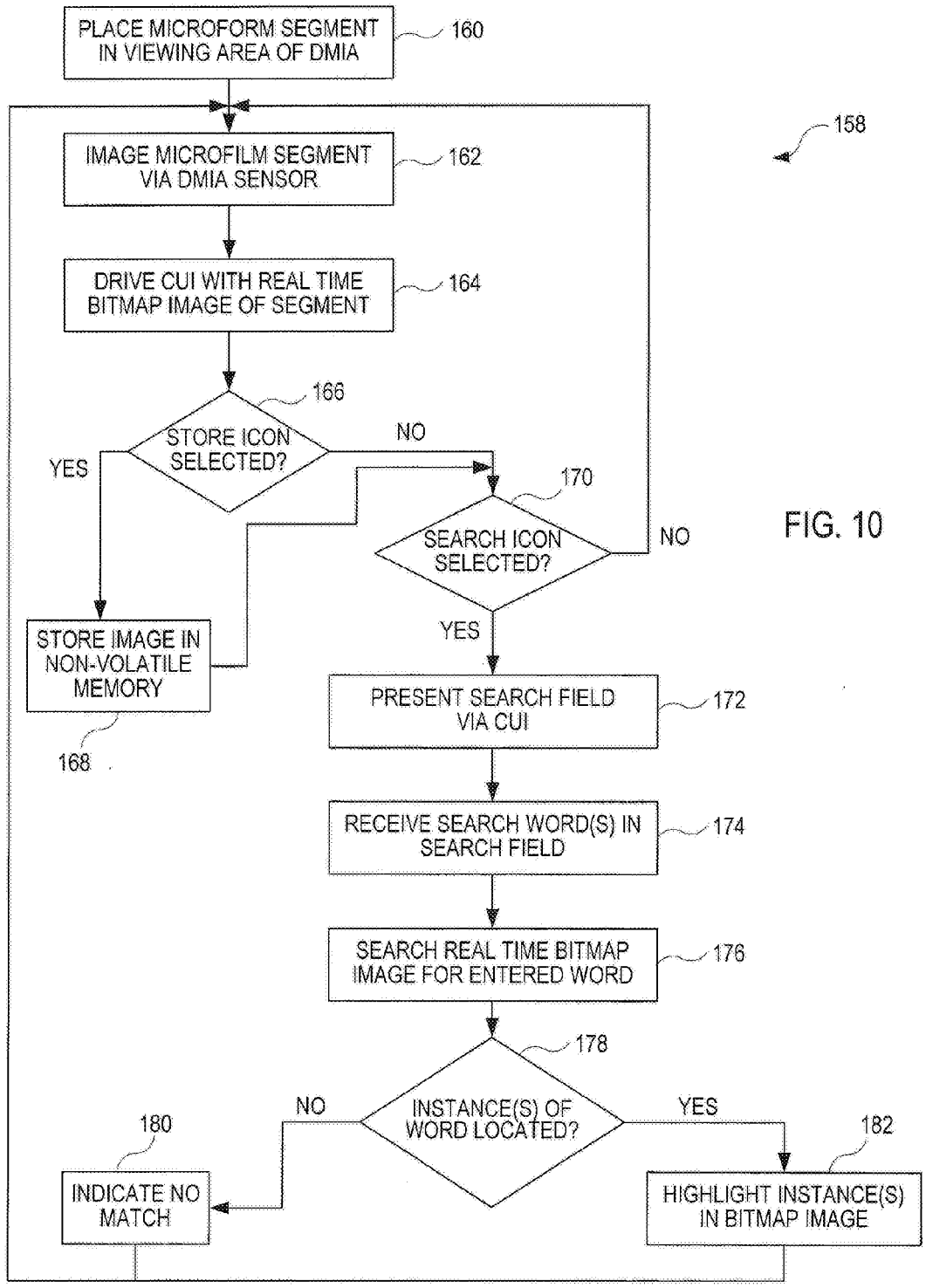
FIG. 10 is a flow chart illustrating a search process that is consistent with at least some aspects of the present invention.

Referring now to FIG. 10, an exemplary method 158 that is consistent with at least some aspects of the present invention is illustrated. Referring also to FIGS. 1 and 2, at process block 160, a user places a microform segment in the viewing area of DMIA 22 and at block 92, sensor 116 generates a digital bit map microform image which is provided to processor 31. At block 164, processor 31 uses the microform image to drive display 26 in real time.

Referring still to FIGS. 1, 2 and 10, at decision block 166, processor 31 determines whether or not a system user has indicated that the presented image should be stored in the non-volatile memory 35. Where the user indicates that the image should be stored in non-volatile memory 35, control passes to block 168 where the image is stored for subsequent access. At block 166, if the user does not indicate that the image should be stored, control passes to block 170 where processor 31 determines whether or not the user has indicated a desire to search for a word or phase within the image presented. If the user has not indicated a desire to search, control passes back up to block 162 where the microform segment continues to be imaged.

Once again, referring to FIG. 4, a user indicates a desire to search by selecting icon 120. Once icon 120 is selected, control passes to block 172 where processor 31 presents the find text window 108 shown in FIG. 4. At block 174, a user enters a search expression or word to be searched in field 134 and then selects find icon 136.

Referring still to FIGS. 1, 2 and 10, after find icon 136 is selected (see again FIG. 4), processor 31 searches the displayed bit map image in real time for the search expression (i.e., for the entered word). At decision block 178, where one or more instances of the word are located, control passes to block 182 where processor 31 highlights the instance or multiple instances of the word/search expression in the bit map image. Where an instance of the search expression has been identified at block 178, control passes to block 180 where processor 31 indicates that no match has occurred in some fashion. After blocks 180 and 182, control passes back up to block 162 where the process continues as above. If a user switches the segment of the microform storage medium that is being imaged via DMIA 22, process 158 is repeated for the new segment. In at least some embodiments, when a user performs a word search of one segment and then switches to view another microform segment, the find text box 108 (see again FIG. 4) remains on the CUI with the previously sought search expression in field 134 so that the user can simply reselect find icon 136 to continue the search process using the same search expression.

Figure 11:
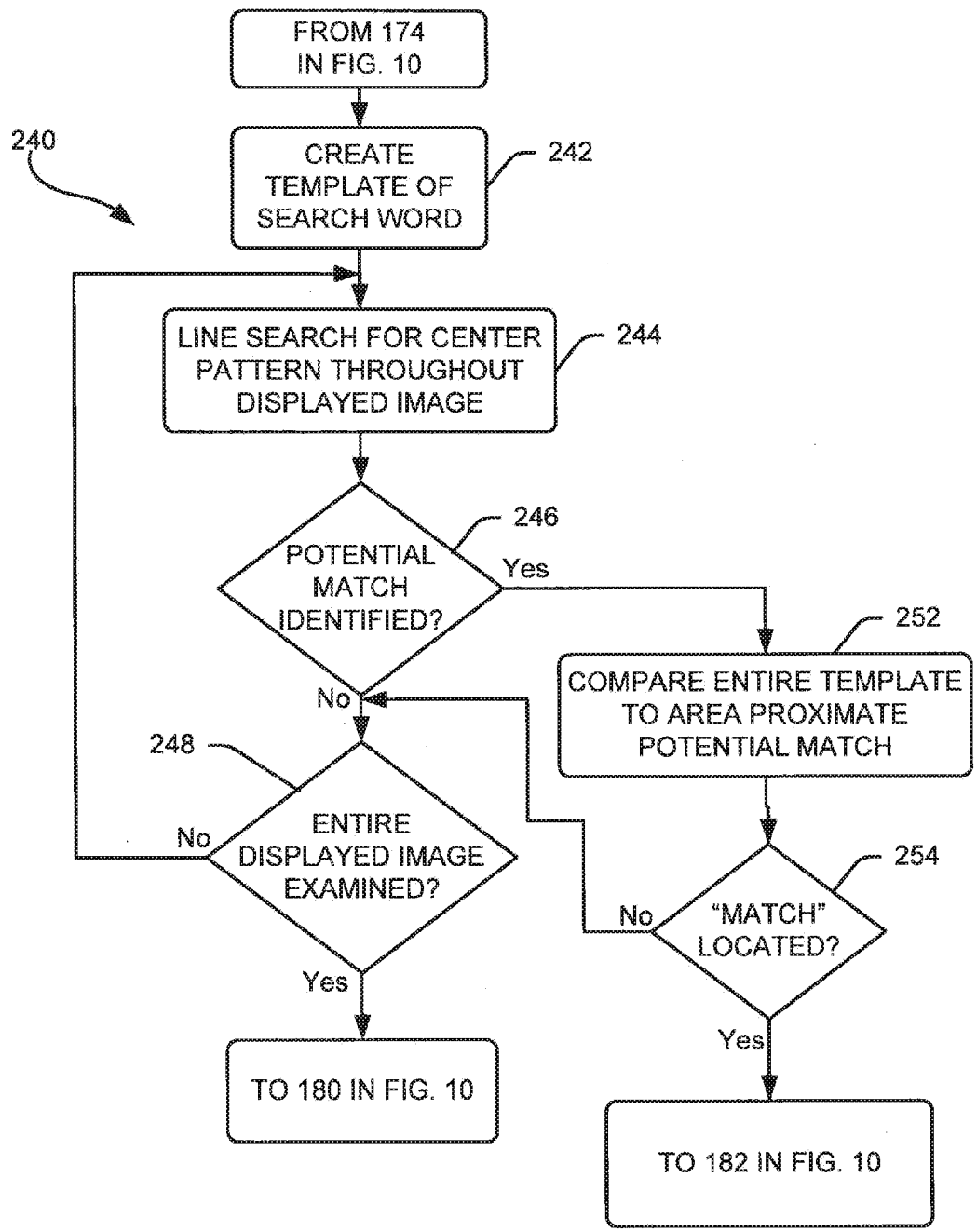
FIG. 11 is sub-process that may be substituted for a portion of the process shown in FIG. 10, to search for instances of a search expression in an iterative fashion.

Referring now to FIG. 11, a sub-process 240 that maybe substituted for a portion of the process shown in FIG. 10 is illustrated. Referring also to FIG. 10, after a search word or expression has been received by processor 31 at block 174, control may pass to block 242 in FIG. 11 where processor 31 creates a template as shown best in FIG. 6. Next, at block 244, processor 31 uses the center pattern 190 (see again FIG. 7) from the template to line search (see again FIG. 8) throughout the displayed microform image for possible instances of the search expression. At decision block 246, where no potential matches have occurred, control passes to block 248. At decision block 248, where the entire displayed image has been examined, control passes back to block 180 in FIG. 10 where processor 31 indicates that no match has occurred. At block 248, where the entire displayed image has not been examined, control passes back up to block 244 where processor 31 continues the line searching process.

Referring still to FIG. 11, at decision block 246, where a potential match has been identified, control passes to block 252 where processor 31 compares the entire search template to an area proximate the potential match. At block 254, where a search expression match has been verified, control passes back to block 182 in FIG. 10 where the instance or instances of the search expression in the bit map are highlighted.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

To apprise the public of the scope of this invention, the following claims are made:

What is claimed is:

1. A digital imaging system for searching for expressions that appear on a microform medium, the system comprising:
   a computer including a processor, a display, a memory, and an input device, wherein the processor is in communication with the display, the memory, and the input device; and
   a digital microform imaging apparatus including a controller and an area sensor generating a digital microform image of the microform medium, the controller is in communication with the area sensor and receives the digital microform image from the area sensor, and the controller is in communication with the processor and outputs the digital microform image to the processor;
   wherein the processor is configured to receive a search expression from the input device, create an expression template representing a shape of the search expression by laying a multi-column row raster over the search expression and generating an element value for each element in the raster that indicates a percentage of the element covered by the search expression, and search the digital microform image for instances of the expression template.

2. The digital imaging system of claim 1, wherein the computer is integrated into the digital microform imaging apparatus.

3. The digital imaging system of claim 1, wherein the processor is configured to visually distinguish identified instances of the search expression on the display.

4. The digital imaging system of claim 1, wherein the area sensor is configured to generate the digital microform image that is a segment of the microform medium.

5. The digital imaging system of claim 1, wherein the processor is configured to select a portion of the expression template to identify expression candidates and search the digital microform image at areas around the expression candidates for an instance of the search expression using the expression template.

6. The digital imaging system of claim 1, wherein the controller is in communication with the processor via a cable.

7. The digital imaging system of claim 1, wherein the area sensor is configured to generate the digital microform image that is a bitmap image.

8. The digital imaging system of claim 1, wherein the input device is at least one of a keyboard and a mouse.

9. The digital imaging system of claim 1, wherein the processor and the controller are integrated.

10. A method of searching for expressions that appear on a microform medium using a digital imaging system, the system comprising a computer including a processor, a display, a memory, and an input device, and a digital microform imaging apparatus including an area sensor, the method comprising the steps of:

generating with the area sensor a digital microform image of the microform medium;

communicating the digital microform image to the computer;

communicating a search expression from the input device to the computer;

creating with the computer an expression template representing a shape of the search expression; and searching with the computer the digital microform image for the expression template;

wherein the step of creating with the computer the expression template representing the shape of the search expression comprises:

laying with the computer a multi-column row raster over the search expression; and generating with the computer an element value for each element in the raster that indicates a percentage of the element covered by the search expression.

11. The method of claim 10 wherein the step of creating with the computer the expression template representing the shape of the search expression comprises selecting with the computer a portion of the expression template to be used during a first rough phase, the portion including element values along the portion.

12. The method of claim 11 wherein the step of selecting with the computer the portion of the expression template to be used during a first rough phase comprises selecting the portion along a central line pattern through the elements.

13. The method of claim 10 wherein the step of searching with the computer the digital microform image for the expression template comprises searching along a series of horizontal lines through the digital microform image for possible matches.

14. The method of claim 13 wherein the step of searching with the computer the digital microform image for the expression template comprises the computer using the expression template to search areas around each possible match.

15. The method of claim 14 wherein the step of searching with the computer the digital microform image for the expression template comprises generating with the computer a match score indicating how closely each possible match matches the expression template.

16. The method of claim 15 wherein the step of searching with the computer the digital microform image for the expression template comprises visually distinguishing each possible match when the match score for the possible match exceeds a match threshold.

17. A method of searching for expressions that appear on a microform medium using a digital imaging system, the system comprising a computer including a processor, a display, a memory, and an input device, and a digital microform imaging apparatus including an area sensor, the method comprising the steps of:

the area sensor generating a digital microform image of the microform medium;

the computer receiving the digital microform image;

the computer receiving a search expression from the input device;

the computer creating an expression template representing a shape of the search expression;

the computer laying a multi-column row raster over the search expression;

the computer generating an element value for each element in the raster that indicates a percentage of the element covered by the search expression;

the computer searching the digital microform image for the expression template.

18. The method of claim 17 further comprising the steps of:

the computer selecting a portion of the expression template as an initial template;

the computer searching the digital microform image for instances of the initial template to identify expression candidates;

the computer searching areas around each expression candidate within the digital microform image for an instance of the search expression using the expression template.

19. The method of claim 18 further comprising the step of the computer comparing the entire expression template to the areas around each expression candidate.

20. The method of claim 10, wherein the step of generating with the area sensor a digital microform image of the microform medium comprises generating with the area sensor a bitmap image.

21. The method of claim 11, wherein step of searching with the computer the digital microform image for the expression template comprises searching with the computer the digital microform image for instances of the portion of the expression template to identify possible matches.

22. The method of claim 21 wherein step of searching with the computer the digital microform image for the expression template further comprises the computer using the entire expression template to search areas around each possible match.

\* \* \* \* \*